(12) United States Patent
Noblett

(10) Patent No.: US 6,362,004 B1
(45) Date of Patent: Mar. 26, 2002

(54) APPARATUS AND METHOD FOR USING FIDUCIAL MARKS ON A MICROARRAY SUBSTRATE

(75) Inventor: David Noblett, Oak Park, CA (US)

(73) Assignee: Packard BioChip Technologies, LLC, Billerica, MA (US)

(*) Notice: Subject to any disclaimer, the term of this patent is extended or adjusted under 35 U.S.C. 154(b) by 0 days.

(21) Appl. No.: 09/436,974

(22) Filed: Nov. 9, 1999

(51) Int. Cl.[7] .............................................. G01N 21/01
(52) U.S. Cl. ........................ 436/43; 422/63; 422/82.05; 422/82.08; 422/100; 435/287.1; 436/56; 436/164; 436/172; 356/244; 382/133
(58) Field of Search ....................... 422/63, 65, 82.05, 422/82.08, 99, 100, 102, 104; 436/43, 47, 56, 164, 165, 172, 174; 435/287.1, 287.3; 356/244, 246; 382/128, 129, 133, 134

(56) References Cited

U.S. PATENT DOCUMENTS

| | | | |
|---|---|---|---|
| 5,465,152 A | 11/1995 | Bilodeau et al. | 356/371 |
| 5,581,487 A | 12/1996 | Kelly et al. | 364/571.01 |
| 5,643,798 A | 7/1997 | Beavis et al. | 436/94 |
| 5,843,767 A * | 2/1998 | Beattie | 422/82.05 |
| 5,807,522 A | 9/1998 | Brown et al. | 422/50 |
| 5,870,508 A | 2/1999 | Park | 382/289 |
| 5,985,214 A * | 11/1999 | Stylii et al. | 422/63 |
| 6,215,894 B1 * | 4/2001 | Zeleny et al. | 382/133 |
| 6,258,326 B1 * | 7/2001 | Modlin | 422/102 |

FOREIGN PATENT DOCUMENTS

| | | |
|---|---|---|
| EP | 0571053 A2 | 11/1993 |
| EP | 0571053 A3 | 11/1993 |
| WO | WO99/08233 | 2/1999 |

OTHER PUBLICATIONS

"Microarray Imaging," slide presentation by Genomic Solutions, Inc., Jul. 1, 1999.
"Array Vision Systems for Genomics," brochure prepared by Imaging Research Inc., 1997.

* cited by examiner

Primary Examiner—Joseph W. Drodge
(74) Attorney, Agent, or Firm—Cesari and McKenna, LLP

(57) ABSTRACT

A microarray scanning system for conducting experiments on a planar substrate includes an apparatus for translating the secured substrate in two axes, the substrate having at least one fiducial mark on the planar substrate as a means for positioning and aligning the substrate for subsequent spot placement, analysis, or comparison procedures. The at least one fiducial mark is deposited at a predetermined position relative to the at least one location of a corresponding microarray of test spots or samples.

17 Claims, 7 Drawing Sheets

APPARATUS AND METHOD FOR USING FIDUCIAL MARKS ON A MICROARRAY SUBSTRATE

CROSS REFERENCE TO RELATED APPLICATION

This application is related to co-pending, commonly-assigned application Ser. No. 09/437,039 filed Nov. 09, 1999 entitled "Apparatus and Method for Calibration of a Microarray Scanning System."

BACKGROUND OF THE INVENTION

1. Field Of the Invention

This invention in general relates to optical scanning systems and, in particular, to an apparatus and method for aligning and positioning microarray samples in a microarray scanning system.

2. Description Of The Prior Art

Microarray samples are being increasingly used for the performance of large numbers of closely-related chemical tests. Reference or 'target' DNA (or RNA) is deposited as an array of target spots, or samples, onto a glass substrate—typically a one-by three-inch glass microscope slide—where the genetic material chemically binds to the substrate surface. Each target spot of genetic material constitutes the locus of a separate experiment. 'Probe' DNA (or RNA) containing a fluorophore material is then added to some or all of the target spots and is allowed to hybridize with the target material. Excess probe material that does not hybridize with and bind to target material is removed from the microarray sample surface in a subsequent washing process.

The experiments measure the binding affinities between probe DNA and target DNA, for example, to determine the similarity in their molecular structures; complementary molecules have a much greater probability of binding than unrelated molecules. The fluorophore present in the probe material emits a range of radiation energy centered about a wavelength $\lambda_{emission}$ in response to illumination by an incident radiation source of a particular, shorter wavelength $\lambda_{excitation}$. The brightness of emitted radiation, as measured by the detection system of the microarray scanning system, is a function of the fluorophore concentration present in the illuminated sample. Because the fluorophore concentration is a function of the binding affinity or likeness of the probe molecule to the target molecule, the brightness of a hybridized spot is an indication of the degree of similarity between the probe genetic material and the target genetic material present. A typical microarray sample may allow up to tens of thousands of experiments to be performed simultaneously on the genetic material, thus producing a detailed characterization of a particular gene under investigation.

In a microarray scanning system, the area of interest is usually divided into an array of discrete elements referred to as 'pixels.' Each pixel is illuminated independently as it is being addressed by the scanning system. The excitation radiation source is typically a single-wavelength laser device focused down to form an excitation radiation spot of the desired size. Emission radiation is emitted by the illuminated fluorophore in an outward, spherical beam. A portion of this emission beam is collected by an optical system and transmitted to a detector. In addition to the emitted radiation, some of the incident excitation radiation scattered from the surface of the sample is also collected by the optical system. To minimize the amount of excitation radiation reaching the detector, the optical system may be designed using filtering components, such as dichroic and band-pass filters, to provide discrimination between excitation and emission radiation wavelengths.

The process used to deposit a microarray of target and probe genetic material onto a substrate is conventionally referred to as spot placement. In the present state of the art, spot placement is performed by means of a gantry type computer-controlled robotic system. This conventional method typically requires additional procedures following the placement process to compensate for imprecise spot placement. For example, the operator may need to perform a low-resolution scan of the microarray sample to locate the spots of genetic material prior to performing the high-resolution scan used for quantitation.

Differential gene expression refers to a comparative experiment in which the gene expression of a known 'control' sample is compared to the gene expression of a 'test' sample to determine the difference in gene expression levels. This comparison process determines the proportion of one gene identified with respect to another gene. Unique fluorophore materials are utilized (i.e., one fluorophore material for each gene) in gene expression experiments. Use of unique fluorophore materials makes it possible to view the information from each gene separately; otherwise no differential information could be obtained. This comparison process is not limited to the use of only one control sample and one test sample. In the present state of the art, five or more unique excitation wavelengths can be used to provide one control image and at least four additional test images.

A unique wavelength of light is used to excite a fluorescent emission from a corresponding fluorophore material. This produces an image file for the control sample and a separate image file for each test sample. In the image files, each spot is mapped to a corresponding brightness value as an indication of gene expression level. In way of example, the control image can be depicted using a green color palette, and the test image can be depicted in red. When the control and the test images are superimposed, certain superimposed spots appear yellow, with varying hue and brightness, in those locations where the corresponding control spot was green and the test spot was red. In the locations where only one of the control and test spots exhibited color, the superimposed spot would, accordingly, appear as an individual red or green spot. Alignment of the control and test images can be facilitated by computer software that provides a means to variably offset one image from the other by the use of appropriate keystrokes. Although this feature may allow the user to align the superimposed spots with more precision to provide a higher quality assessment, the process can still be tedious and lengthy.

Before an operator calculates the brightness of each hybridized spot and of the local background prior to quantitating the microarray sample, a mapping or pattern of the microarray spot locations is usually generated. The microarray mapping is a template used by the detection software to more efficiently search for the true locations of each spot in the pattern. For a relatively small number of spots (e.g., less than one hundred), the operator can usually locate each spot manually. For microarray patterns of more than one hundred spots, manual location becomes cumbersome, and for even larger arrays, the process of manual location becomes impractical. Moreover, the trend in the present state of the art is to develop automated methods of microarray inspection and it is desirable to provide efficiency and accuracy in the creation of the microarray configuration and in the methods of quantitation of the spots.

Several parameters can be used to fully describe a regular grid pattern: the numbers of rows and columns of spots, the distances between rows and columns, and the average diameter of each spot. The direct method of generating a regular grid pattern requires the manual entry of appropriate values for each of these parameters. This direct method, however, relies on having prior information as to the parameters of the microarray pattern and, because of the imprecision inherent in conventional spot placement methods (e.g., manual placement, robotic spot placement equipment) the parameter values will likewise be relatively imprecise, making the direct method even more difficult.

While the relevant art provides a method for performing the above procedures, there remains a need for improvements that offer advantages and capabilities not found in presently available methods of scanning, and it is a primary object of this invention to provide such improvements.

It is another object of the present invention to provide a method of scanning in which alignment is achieved quickly and accurately.

Other objects of the invention will be obvious, in part, and, in part, will become apparent when reading the detailed description to follow.

SUMMARY OF THE INVENTION

By using microarray substrates with one or more fiducial marks located at predetermined locations with respect to a microarray sample, the sample can be positioned and aligned with greater precision than with conventional systems in the performance of an alignment or quantitation procedure. The disclosed method uses the stored location(s) of the fiducial mark(s) to apply X- and Y-offsets, and rotations in the X-Y plane, to minimize the distance between all fiducial marks in all related images. This manipulation will have the effect of automatically registering features such as microarray spots that have been accurately placed relative to the fiducial mark locations.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
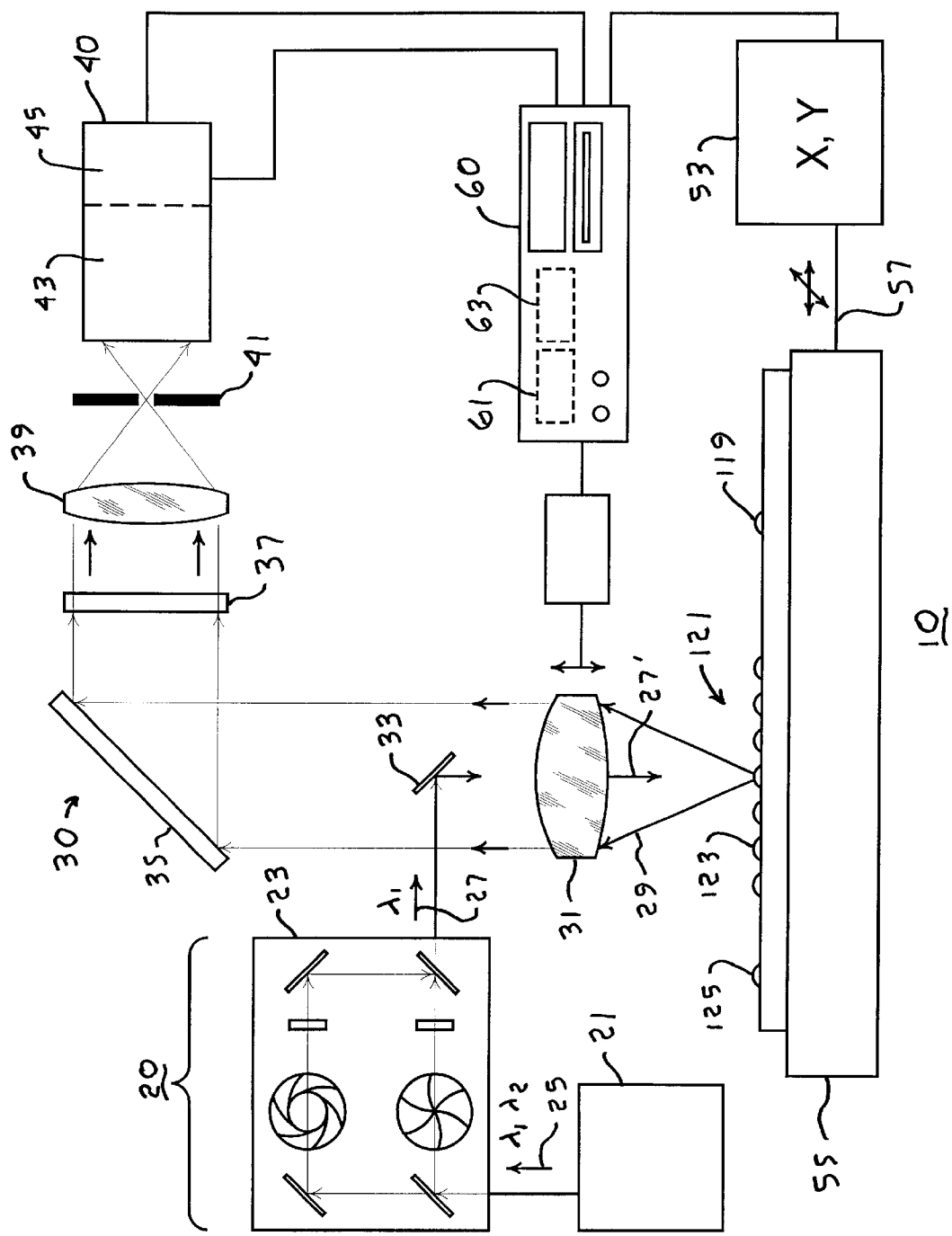
FIG. 1 is a diagrammatical view of a microarray scanning system as used in the analysis of a microarray sample.

There is shown in FIG. 1 a diagrammatical representation of a microarray scanning system 10 as used in the analysis of a microarray sample 100. The microarray scanning system 10 includes an illumination head 20, an optical system 30, a detector 40, a positioning system 50, and a computational device 60, such as a computer. The illumination head 20 includes an excitation radiation source 21 producing source radiation 25 of two or more different wavelengths and a shutter assembly 23.

In the illustration, both a radiation source of wavelength $\lambda_1$ and a radiation source of wavelength $\lambda_2$ are provided for use in the microarray scanning system 10. The shutter assembly 23 functions to select and pass to the optical system 30 a beam of single-wavelength excitation radiation 27, for example $\lambda_1$, from the illumination head 20. It should be understood that operation of the microarray scanning system 10 is not limited to the use of only two wavelengths and that the illumination head 20 may provide excitation radiation of three or more wavelengths. For example, the excitation radiation source 21 may comprise a plurality of single-radiation sources, one or more multi-radiation sources, or a broadband source, to provide excitation radiation of the different wavelengths to be used in the analysis of the microarray sample 100.

The optical system 30 includes an excitation mirror 33 positioned to redirect the excitation radiation beam 27 onto the microarray sample 100 as an incident excitation beam 27'. An objective lens 31 is disposed between the excitation mirror 33 and the microarray sample 100 in the optical path of the incident excitation radiation beam 27'. The objective lens 31 serves to focus the incident excitation beam 27' to a desired spot size incident upon a microarray 121 disposed on the microarray sample 100. By way of example, an objective lens having a focal length of 6.0 mm will project a spot size of about 5 μm from a beam 0.6 mm in diameter enabling resolution of pixel sizes on the order of this dimension.

When the incident excitation radiation 27' illuminates a fluorophore material label present in the microarray 121, there is produced a corresponding emission radiation beam 29 of wavelength $\lambda_{emission}$, typically 20 to 40 nm longer than the wavelength (i.e., $\lambda_1$ or $\lambda_2$) of the incident radiation beam 27'. In the configuration shown, the excitation mirror 33 functions as a geometric beamsplitter. The width of the incident excitation beam 27' is much smaller than the width of the emission radiation beam 29. The relatively small excitation mirror 33 thus reflects the incident excitation beam 27' scattered from the microarray sample 100 back to the illumination head 20 while allowing the greater portion of the emission radiation beam 29 to pass upstream of the objective lens 31 to the detector 40.

The detector 40 may include, for example, an amplifier 45 coupled with a detector apparatus 43, such as a photomultiplier tube, an avalanche photodiode, or a solid state optical detection device. The output of the amplifier 45 is provided to the computational device which includes spot placement software 61 and a memory 63. The sensitivity of the amplifier 45 may be adjusted using a procedure described in the related application, incorporated herein in its entirety by reference.

A band-pass or long-pass filter 37, substantially transmissive to the emission radiation beam 29 and substantially non-transmissive to the excitation radiation beam 27 may be disposed in the optical path of the optical system 30 between the objective lens 31 and a focusing lens 39. In a preferred embodiment, the focusing lens 39 forms a confocal system with the objective lens 31 and images the emission radiation beam 29 onto the detector 40. The optical system 30 may further include a broadband mirror 35 to provide a folded transmission path for the emission radiation beam 29, and an aperture stop 41 may be provided between the focusing lens 39 and the detector 40. The aperture stop 41 serves to block that portion of the illuminated microarray sample 100 which is not in focus. As can be appreciated by one skilled in the relevant art, there may also be provided a corresponding band-pass or long-pass filter for each of the other excitation-emission wavelength pairs utilized by the microarray scanning system 10.

The positioning system 50 includes a positioning controller 53 connected to a substrate platform 55 by means of a mechanical linkage 57. The positioning controller 53 serves to impart translational movement in an X-Y plane to the substrate platform 55. A planar substrate 101 is removably secured to the substrate platform 55 by mechanical restraint, or by a suction device (not shown), as is well-known in the relevant art. The computational device 60 controls the movement of the substrate platform 55 via the positioning controller 53, and thus functions to position the planar substrate 101.

Placement of Target Spots

Figure 2:
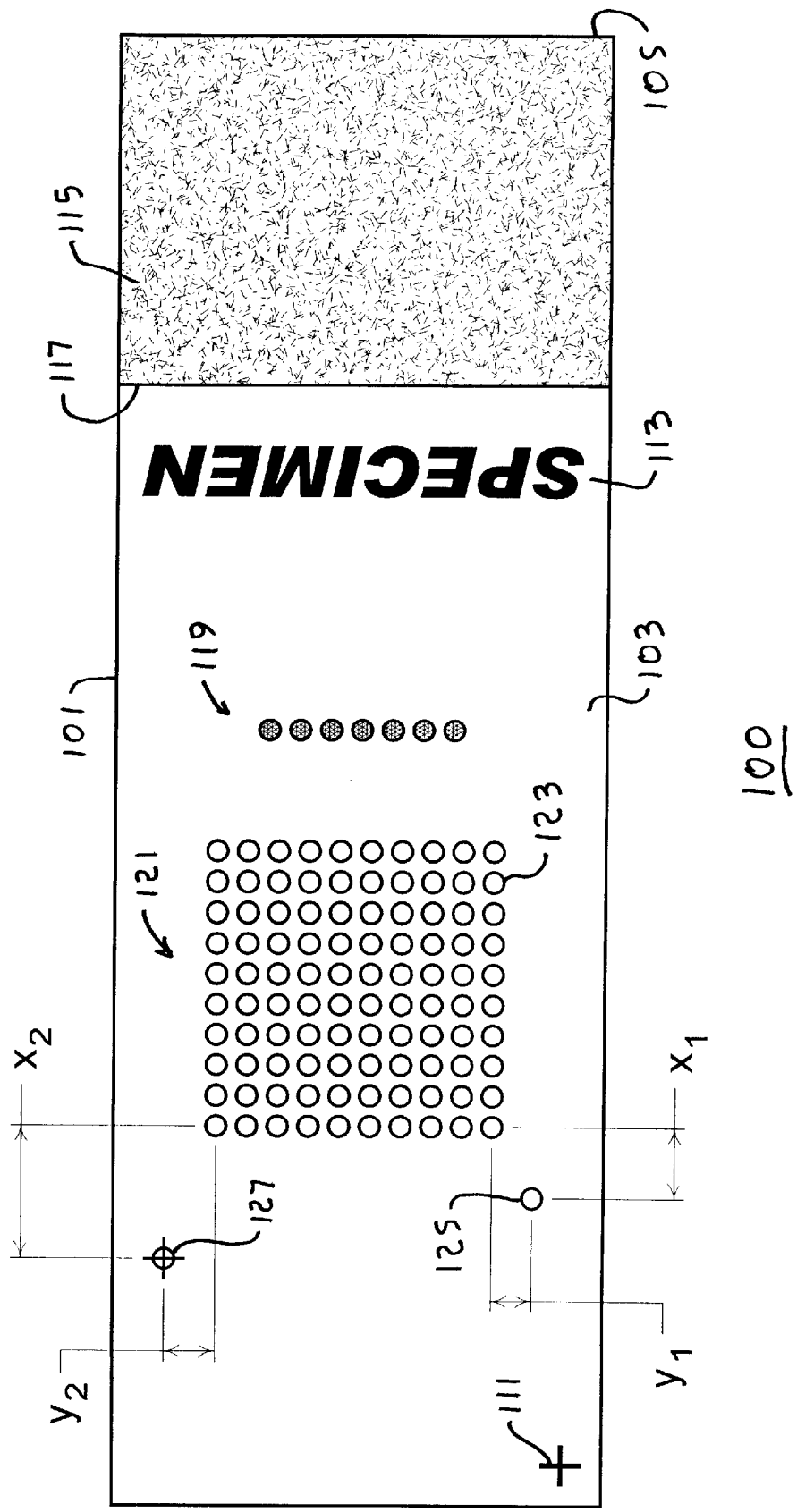
FIG. 2 is a diagrammatical view of the sample surface of the microarray sample of FIG. 1 including an array of target spots.

The operation of the microarray scanning system 10 can best be described with reference to both FIGS. 1 and 2. FIG. 2 is a diagrammatical plan view of the microarray sample 100 which includes a planar substrate 101, such as a one- by three-inch glass microscope slide, having a sample surface 103. There may be imprinted on the sample surface 103 one or more markings applied by the substrate manufacturer. In way of example, such marking may be an identifier 111 or a label 113, or may include an etched or 'frosted' region 115 extending from an end 105 of the planar substrate 101 to a region boundary 117.

The microarray sample 100 includes at least one microarray 121 deposited on the sample surface 103. The microarray 121 comprises a plurality of target spots 123, usually arrayed in rows and columns. In the embodiment shown, a first fiducial mark 125 and a optional second fiducial mark 127 are disposed on the test surface 103 proximate the microarray 121. The first fiducial mark 125 is a spot of approximately the same size as the size of the target spot 123, and may include the same target material forming the target spots 123. The second fiducial mark 127 can be an imprinted mark having a predetermined geometric shape (e.g., a circle superimposed with a crosshair as shown, or a set of concentric circles). It should be understood that the present invention is not limited to the use of one or two fiducial marks and that three, four, or a greater number of fiducial marks can be used on the sample surface 103 so as to improve the accuracy of the procedures described herein.

In a preferred embodiment, one or both of the first fiducial mark 125 and the second fiducial mark 127 are formed onto the sample surface 103 of the planar substrate 101 during the spot placement operation used to produce the microarray 121, as described in greater detail below. There may also be provided a plurality of dilution spots 119 adjacent the microarray 121 for use in calibrating the microarray scanning system 10, as described in the related application.

Figure 3:
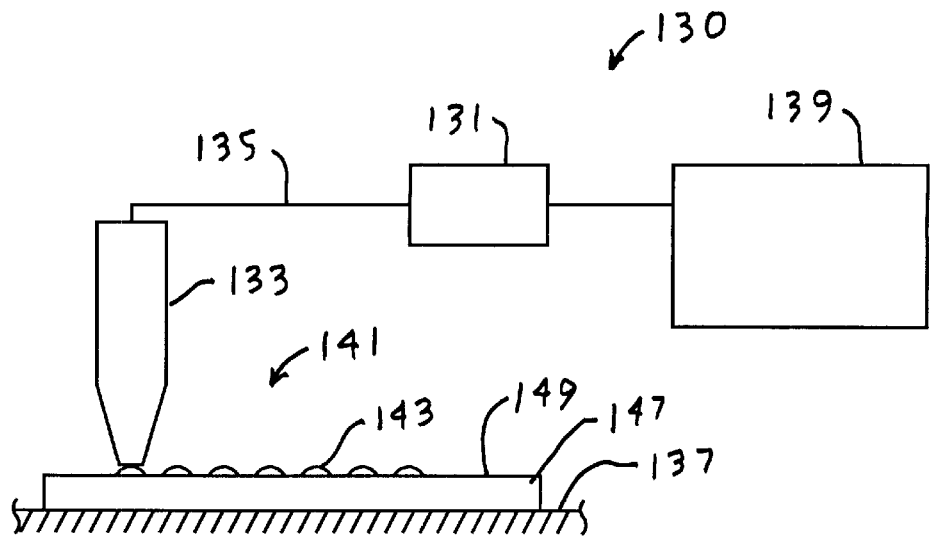
FIG. 3 is a diagrammatical view of a conventional spot placement system.

A conventional spot placement operation can be described with reference to FIG. 3 in which a microarray 141 of target spots 143 is being deposited on a sample surface 149 of a microscope slide 147 by a gantry-style robotic spot placement system 130. The robotic spot placement system 130 includes a spot-positioning device 131 connected to a spot applicator 133 by a mechanical linkage 135. The microscope slide 147 is secured to a support 137 which remains fixed during the conventional spot placement operation. The spot applicator 133 is guided by means of internal positional coordinates residing in a control device 139.

Inaccuracies in the placement of the target spots 143 result from any or all of: i) the inherent precision limitations of the spot positioning device 131, ii) the tolerances present in the mechanical linkage 135, and iii) the performance quality of the control device 139. As can be appreciated by one skilled in the relevant art, the positional reference for placement of the target spots 145, when using the conventional spot placement system 130, is the control device 139 via the spot-positioning device 131. It has been observed that use of this conventional spot placement apparatus and method results in microarray positioning inaccuracies on the order of ±1 mm linear and ±1° angular. As a result, it becomes necessary for the operator to first perform a low-resolution scan of the entire conventionally-placed microarray 141 so as to approximate the positions of the target spots 143 before a high-resolution scanning can be conducted on the microarray 141 as part of the quantitation procedure.

As can be appreciated by one skilled in the relevant art, the inaccuracies resulting from use of the spot placement system 130 described above could be reduced by providing one or more reference points on the substrate surface 149 to be used as the positional reference for placement the target spots 143, rather than using the spot-positioning device 131 as a positional reference. Accordingly, in the present invention, one or both of the first fiducial mark 125 and the second fiducial mark 127, in FIG. 2, are provided as reference points for the relative placement location of each target spot 123 and the microarray 121.

Figure 4:
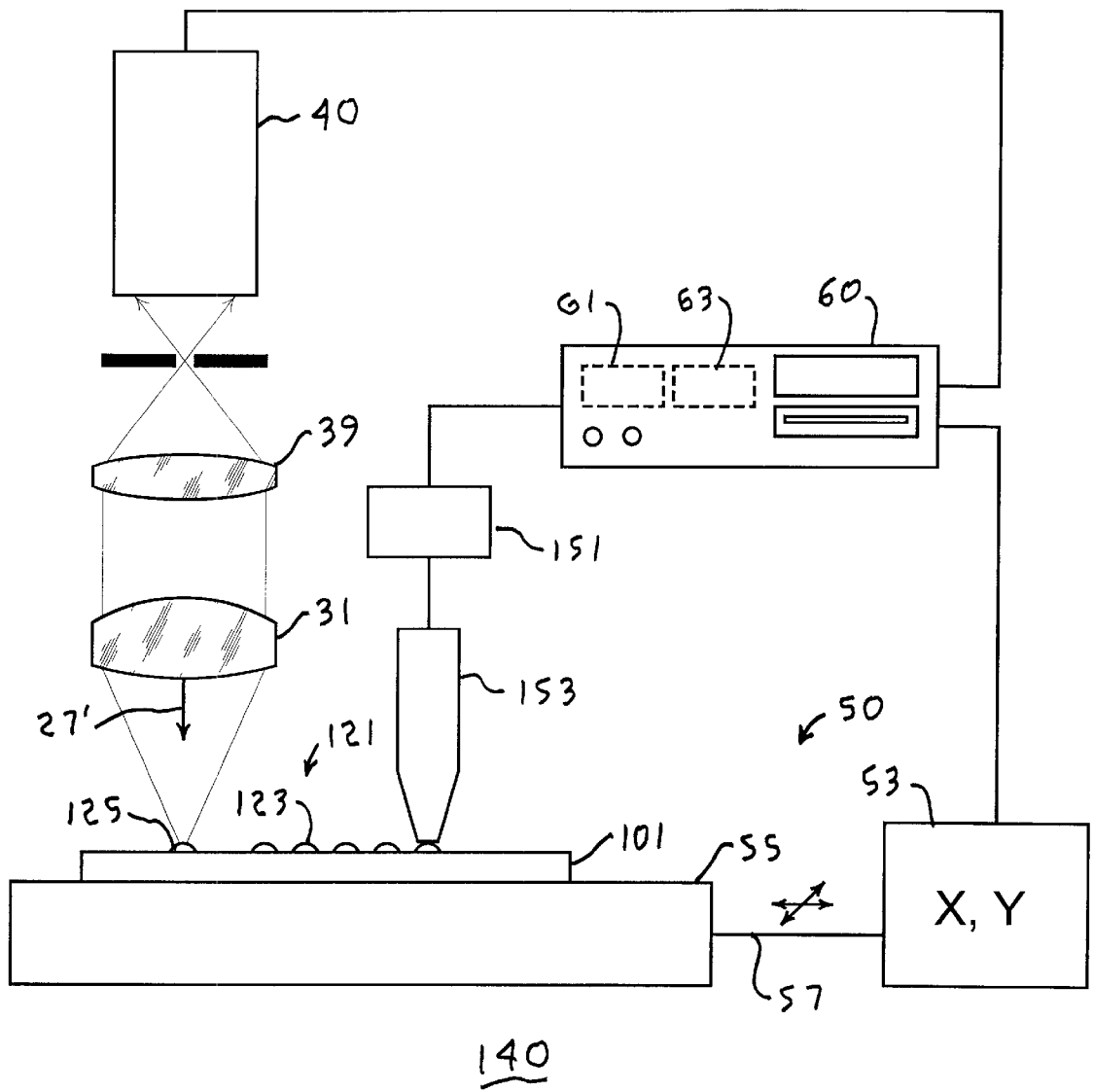
FIG. 4 is a diagrammatical view of a spot placement system in accordance with the present invention.

The first fiducial mark 125 and the optional second fiducial mark 127 are used to advantage by a spot placement system 140, shown in FIG. 4. The spot placement system 140 includes the optical system 30, the positioning system 50, the computational device 60, and an applicator controller 151 coupled to a spot applicator 153. The spot applicator 153 may be a capillary dispenser, such as that described in U.S. Pat. No. 5,807,522 issued to Brown et al. entitled "Methods for fabricating microarrays of biological samples." The spotting functions of dispensing, cleaning, and refilling of the spot applicator 153 are controlled by the applicator controller 151.

A local portion of the sample surface 103 is illuminated by the incident excitation beam 27' and imaged by the combination of the objective lens 31, the focusing lens 39, and the detector 40. The positioning system 50 repositions the microarray sample 100 until the fiducial mark 125 has been imaged and identified. Identification of the fiducial mark 125 is accomplished by an identification routine in the placement software 61.

The geometric center of the leftmost column of the microarray 121, in FIG. 2, is deposited a predetermined precise distance (here denoted by $x_1$,) from the center of the first fiducial mark 125, and the geometric center of the lowermost row of the microarray 121 is placed a predetermined precise distance (denoted by $\lambda_1$) from the center of the first fiducial mark 125. When the second fiducial mark 127 is also provided, the leftmost column of the microarray 121 is located a predetermined precise distance (denoted by $x_2$) from the center of the second fiducial mark 127, and the geometric center of the uppermost row of the microarray 121 is positioned a predetermined precise distance (denoted by $y_2$) from the center of the second fiducial mark 127. The predetermined is distances $x_1$, $y_1$, $x_2$ and $y_2$ are preferably stored in the memory 63 in the computational device 60.

Figure 5:
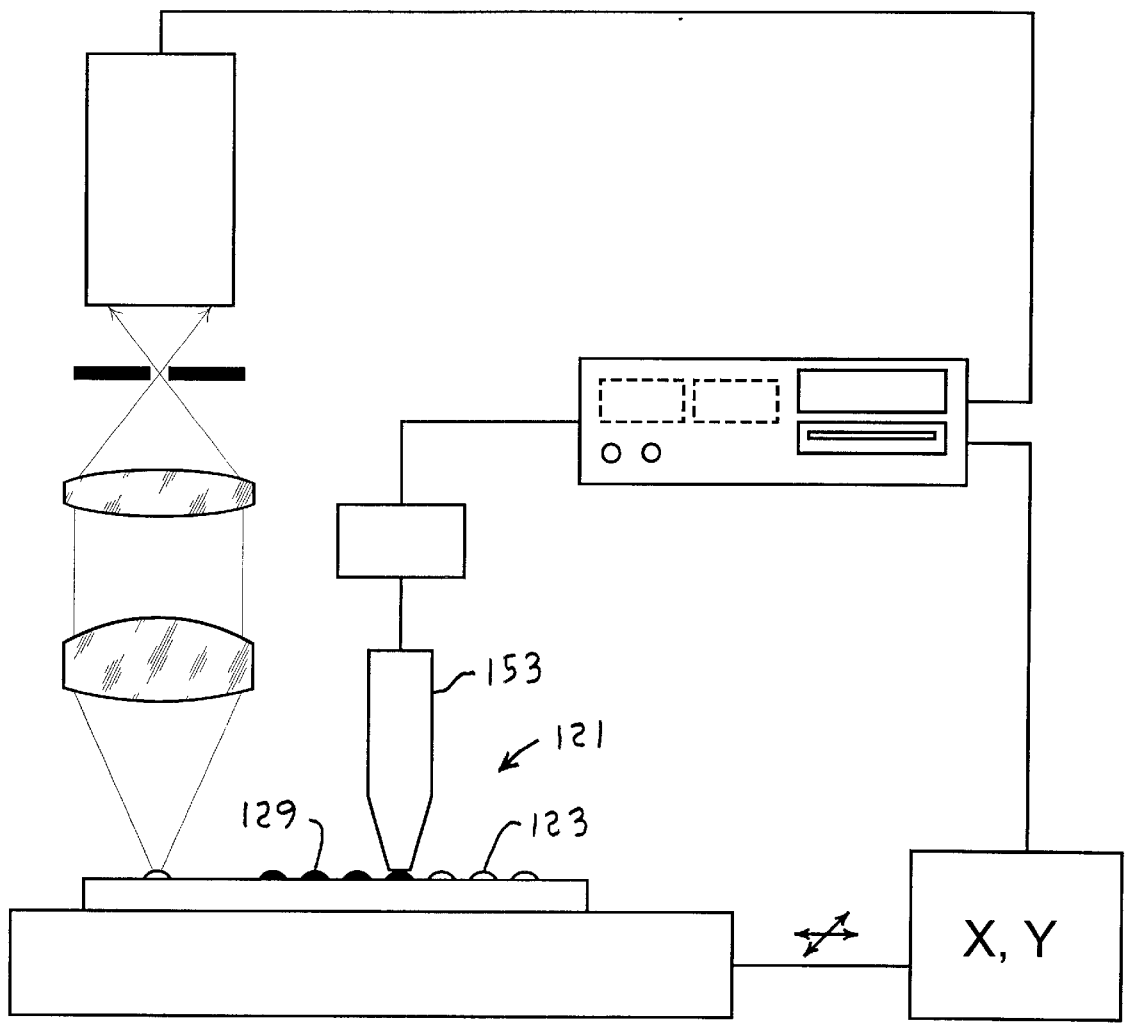
FIG. 5 is a diagrammatical view of the spot placement system of FIG. 4 in the process of adding genetic probe material to the target spots of the microarray sample of FIG. 2.

The spot placement system 140, in FIG. 5, is subsequently used to add fluorescently-tagged genetic probe material to some or all of the target spots 123 in the microarray 121 to produce a plurality of hybridized spots 129. Because the target spots 123 were deposited at precise locations with respect to the fiducial mark 125, the genetic probe material can be automatically and accurately dispensed on the microarray 121 without the need for manual procedures. The process can be used to dispense the probe material on individual target spots 123, in groups of target spots 123, or the probe material can be applied to the entire microarray 121 in a single application.

Figure 6:
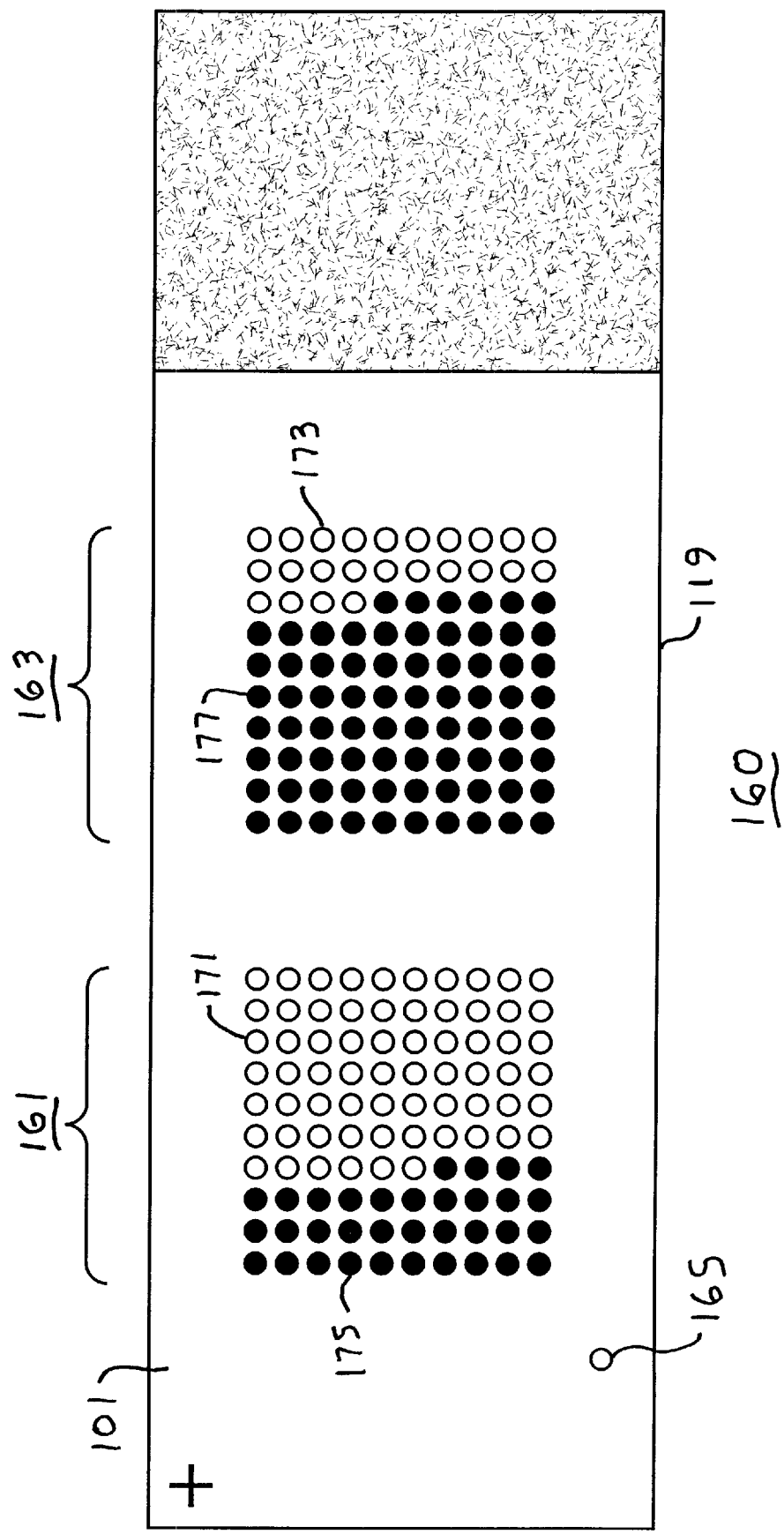
FIG. 6 is a diagrammatical view of an alternative embodiment of the microarray sample of FIG. 2 including a plurality of hybridized spots.

FIG. 6 shows an alternative embodiment of a microarray sample 160 which includes a first microarray 161 with test spots 171 and a second microarray 163 with test spots 173 on the same substrate 101. Genetic probe material has been added to some of the test spots 171 and 173 to form respective hybridized spots 175 and 177. Because placement of the test spots 171 and 173 was done with reference to a fiducial mark 165, the spot placement software 61 can map the coordinates of the target spots 171 and 173 relative to the fiducial mark 167. The stored coordinates may be placed into the memory 63 and used to improve the accuracy or execution of subsequent procedures, such as quantitation.

Scanning of Hybridized Spots

Figure 8:
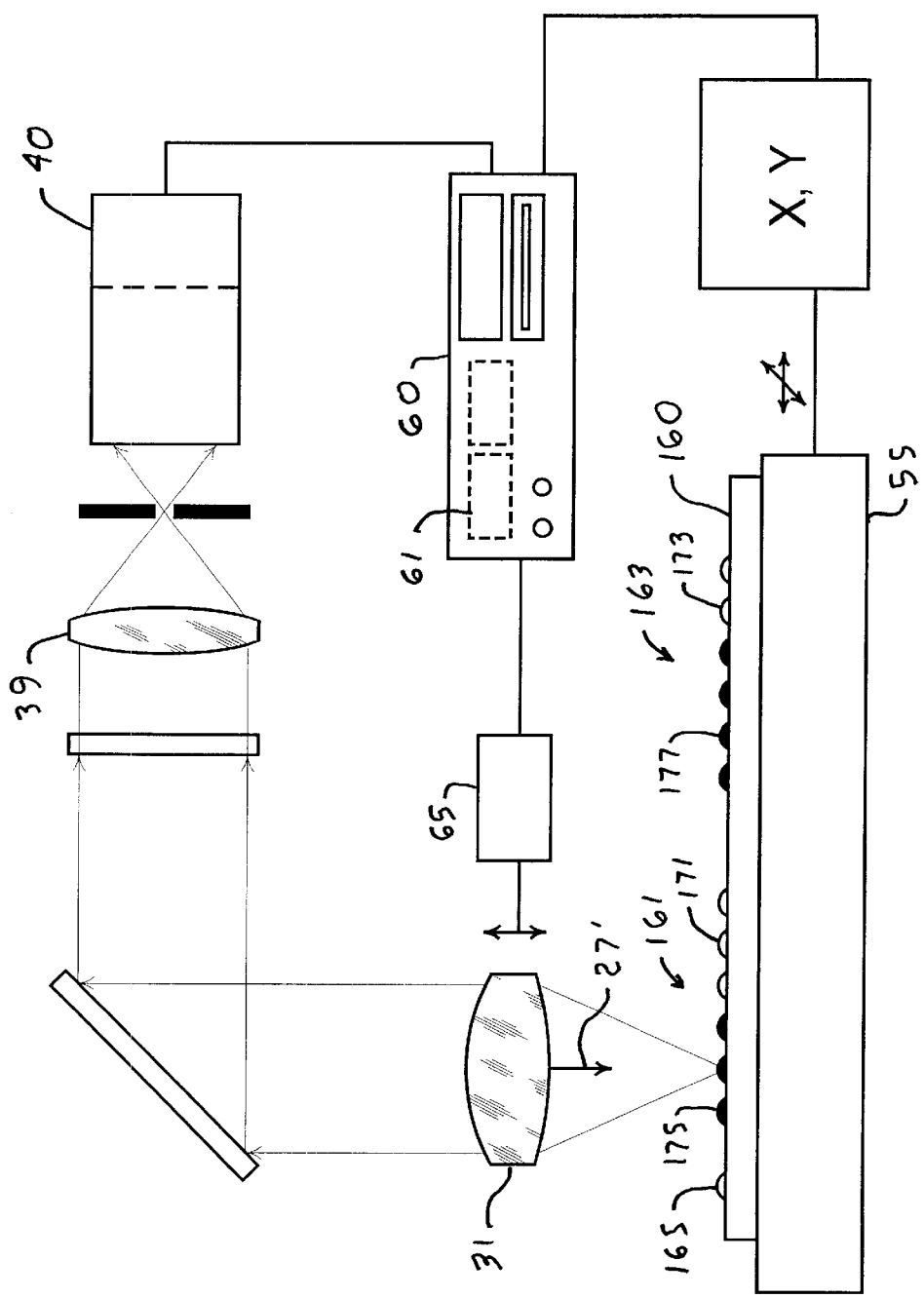
FIG. 8 is a diagrammatical view of the microarray scanning system of FIG. 1 as used in the analysis of the hybridized spots of the microarray sample of FIG. 6.

The scanning and quantitation of the microarray sample 160, for example, can be described with reference to FIG. 8. The microarray sample 160 is secured to the substrate platform 55, and the microarray scanning system 10 optimizes the focus position of the objective lens 31 by utilizing the fiducial mark 165. Focus optimization is accomplished by translating the microarray sample 160 relative to the objective lens 31 until the fiducial mark 165 has been acquired.

The focusing operation includes the steps of: i) illuminating the fiducial mark 165 using the incident excitation radiation 27'; ii) acquiring the illuminated fiducial mark 165 by means of the objective lens 31, the focusing lens 39, and the detector 40; iii) sending the image acquired by the detector 40 to the computational device 60; iv) analyzing the acquired image for focused excitation radiation beam size; and v) sending a correction command, as required, to a focus actuator 65 which positions the objective lens 31 along the optical path, as required. The sensitivity setting of the detector 40 can also be adjusted by using the fiducial mark 165 in accordance with the procedure described in the related application.

After the focusing operation and sensitivity adjustments have been performed, the computational device 60 generates a quantification grid for placement over the microarrays 161 and 163. This is done by using the location of the fiducial mark 165 to precisely place the location of all hybridized spots 175 and 177. The quantification grid is generated from preprogrammed parameters (e.g., spot diameter, spot spacing, and array spacing) to represent an initial regular grid. This initial grid is subsequently deformed, or adjusted, by the system software to match the actual locations of the hybridized spots 175 and 177.

Figure 7:
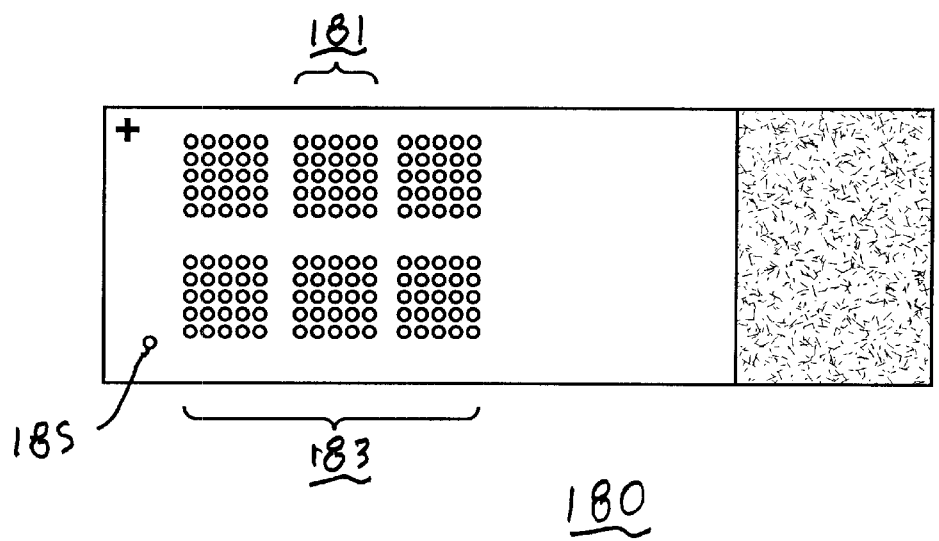
FIG. 7 is a diagrammatical view of the sample surface of a microarray sample including multiple arrays of target spots.

The regular grid pattern can be extended to produce more than one microarray set on the same substrate. FIG. 7 shows a microarray sample 180 which includes multiple arrays 181 forming an array set 183. Placement of the individual arrays 181 and of the array set 183 is accomplished, as described above, with reference to a fiducial mark 185.

Image Alignment

In the process of image alignment, the first fiducial mark 125 and the second fiducial mark 127 are further used to accurately and automatically align multiple images gathered by a microarray scanner from within an alignment or quantitation program. The method used the measured locations of all fiducial marks present in each image to manipulate the images by applying X- and Y-offsets and rotations to minimize the distance between all fiducial marks in all images. This manipulation will have the effect of automatically registering features in the multiple images.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A microarray sample suitable for use in a microarray analyzer, said microarray sample comprising:
    a planar substrate comprising a sample surface;
    a plurality of target spots disposed on said sample surface at at least one location; and
    a fiducial mark disposed on said sample surface, said fiducial mark located at a predetermined position relative to the at least one location of said plurality of target spots.

2. The microarray sample of claim 1 wherein said planar substrate comprises a microscope slide.

3. The microarray sample of claim 1 wherein said target spot comprises a genetic material.

4. The microarray sample of claim 1 wherein said fiducial mark comprises genetic material.

5. The microarray sample of claim 1 wherein said first fiducial mark comprises a geometric shape.

6. The microarray sample of claim 1 further comprising a second fiducial mark that is located a predetermined position relative to the location of said plurality of target spots.

7. The microarray sample of claim 6 wherein said second fiducial mark comprises at least one of the group consisting of an imprinted geometric shape, imprinted lettering, an etched region, and a predetermined mark discernible by an imaging system of the microarray analyzer.

8. The microarray sample of claim 1 wherein said fiducial mark comprises genetic material that responds to various materials used to test said target spots.

9. A microarray scanning system for conducting one or more sets of experiments on a planar substrate, said system comprising:
    means for securing the substrate;
    means for translating the substrate in two axes;
    means for applying at least one fiducial mark onto the planar surface at a predetermined position relative to a location of an array of target spots; and
    means for applying the array of target spots at said location on said substrate.

10. The microarray scanning system of claim 9 further comprising:
    detection means for detecting said at least one fiducial mark; and
    computational means for assigning coordinates to said at least one fiducial mark.

11. The microarray scanning system of claim 10 further including means for aligning multiple images of said samples using said fiducial marks.

12. The method of claim 11 wherein the step of aligning includes applying X- and Y-offsets and rotations to said images to minimize the distance between said respective fiducial marks.

13. A method for performing a series of measurements on a microarray of samples disposed on a substrate, said method comprising the steps of:
    A. locating at least one fiducial mark on the substrate, said fiducial mark being at a predetermined position relative to a location of the samples;

B. aligning the microarray to a standard coordinate system using said at least one fiducial mark;

C. irradiating at least one of the samples with a source of optical excitation radiation so as to produce at least one fluorescent emission;

D. optically detecting said at least one fluorescence emission; and

E. storing said detection event in a retrievable storage medium.

14. The method of claim 13 further comprising the steps of:

irradiating said at least one sample with a second source of optical excitation radiation so as to produce at least a second fluorescent emission;

optically detecting said second fluorescence emission; and storing said second detection event in said retrievable storage medium.

15. The method of claim 13 further including the steps of performing steps A–E with one or more of a plurality of microarrays of samples; and aligning images of said microarrays based on the positions of said respective fiducial marks.

16. The method of claim 13 further including the steps of performing steps A–E with one or more of a plurality of microarrays of samples; and registering features in images of said microarrays based on the relative positions of said fiducial marks.

17. A microarray scanning system for conducting one or more sets of experiments on a planar substrate, said system comprising:

a positioning sub-system that positions the substrate by translating the substrate in two axes;

a spot placement sub-system that deposits material on the substrate, the spot placement sub-system depositing material comprising target spots deposited at at least one location and at least one fiducial mark, with the at least one fiducial mark located at at least one predetermined position relative to the at least one location of an array of the target spots.

* * * * *